United States Patent [19]

Magan et al.

[11] Patent Number: 5,610,328
[45] Date of Patent: Mar. 11, 1997

[54] MISFIRE DETECTOR FOR 50% MISFIRE RATE

[75] Inventors: Amit T. Magan, Belleville; Kathleen A. Grant, Farmington Hills; Dennis C. Krzyske, New Boston, all of Mich.

[73] Assignee: Ford Motor Company, Dearborn, Mich.

[21] Appl. No.: 511,209

[22] Filed: Aug. 4, 1995

[51] Int. Cl.⁶ ................................................. G01M 15/00
[52] U.S. Cl. ............................................................ 73/117.3
[58] Field of Search .................................. 73/35.01, 35.03, 73/116, 117.2, 117.3; 123/419, 436; 364/431.07, 431.08

[56] References Cited

U.S. PATENT DOCUMENTS

| | | |
|---|---|---|
| 5,044,195 | 9/1991 | James et al. . |
| 5,056,360 | 10/1991 | Dosdall et al. . |
| 5,095,742 | 3/1992 | James et al. . |
| 5,109,695 | 5/1992 | James et al. . |
| 5,305,635 | 4/1994 | James et al. . |
| 5,361,629 | 11/1994 | McCombie . |
| 5,394,744 | 3/1995 | James et al. . |
| 5,452,604 | 9/1995 | Namiki et al. ................... 73/117.3 |
| 5,542,291 | 8/1996 | James ............................... 73/117.3 |

OTHER PUBLICATIONS

Misfire Detection by Evaluating Crankshaft Speed—A Means to Comply with OBDII, by Mark Klenk, Winfried Moser, Werner Mueller & Wolfgang Wimmer, SAE Technical Paper Series, #930399 Mar. 1–5, 1993 pp. 1–10.

*Primary Examiner*—Richard Chilcot
*Assistant Examiner*—Eric S. McCall
*Attorney, Agent, or Firm*—Mark Mollon

[57] ABSTRACT

A misfire detector for an internal combustion engine obtains a baseline crankshaft acceleration value that degrades at a 50% misfire rate in a predetermined way that is capable of subsequent correction. The width of a median averaging function is selected that provides a cyclical deviant acceleration under all expected conditions of 50% misfire. The cyclical deviant acceleration is corrected by summing adjacent values. The corrected acceleration is compared to a specially adapted misfire threshold that is exceeded only if the deviant acceleration is cyclical.

7 Claims, 4 Drawing Sheets

5,610,328

MISFIRE DETECTOR FOR 50% MISFIRE RATE

BACKGROUND OF THE INVENTION

The present invention relates in general to detecting misfires occurring during normal in-use vehicle operation of internal combustion engines, and more specifically to a method of examining crankshaft acceleration that identifies misfires occurring at a rate of 50% of total cylinder events.

Monitoring of crankshaft acceleration in an internal combustion engine is a preferred technique to detect misfires of individual cylinder firings during engine operation. An advantageous system for crankshaft based misfire detection is described in U.S. Pat. Nos. 5,044,195; 5,056,360; and 5,109,695. This system utilizes the determination of a deviant acceleration, which is the difference between the instantaneous acceleration for an individual cylinder firing and an estimated baseline acceleration. In particular, the baseline acceleration is determined as a median average over a series of cylinder accelerations including the cylinder firing of interest.

The foregoing system achieves acceptable sensitivity at low misfire rates (i.e., provides reliable detection and a low false alarm rate) thereby making crankshaft-based misfire detection feasible. However, the typical method employed for determining a baseline acceleration lacks the ability to detect high misfire rates (specifically 50% of cylinder events being misfires). More specifically, prior averaging methods (including median averaging) are distorted unacceptably by the presence of data from misfires when those misfires comprise 50% of the data within the averaging window.

Although a 50% misfire rate may be a rare occurrence and although such a condition may be apparent from roughness in engine operation, it may nevertheless be desirable to electronically detect such a condition so that it can be recorded and/or corrective action can be taken. Furthermore, for some engines and some types of ignition systems, a 50% misfire rate can result from a single component failure (e.g., a coil failure in a four-cylinder distributorless wasted-spark ignition system using two coils).

SUMMARY OF THE INVENTION

The present invention has the advantage of determining a baseline acceleration value that provides reliable misfire detection at a 50% misfire rate.

In summary, the present invention obtains a baseline acceleration value that degrades at a 50% misfire rate in a predetermined way that is capable of subsequent correction. Specifically, the width of the median function is selected that provides a cyclical (i.e., symmetrical) deviant acceleration under expected conditions of 50% misfire. The cyclical deviant acceleration is corrected by summing adjacent values. The corrected acceleration is compared to a specially adapted misfire threshold that is exceeded only if the deviant acceleration is cyclical.

More specifically, the present invention provides a misfire detection system for a multi-cylinder internal combustion engine having a crankshaft comprising a first misfire detector and a second misfire detector. The first misfire detector responds to occurrence of misfires at rates less than 50% by determining a first deviant acceleration in response to a difference between a raw crankshaft acceleration and a first baseline acceleration. The first baseline acceleration is comprised of a median average of a first predetermined number of samples of the raw crankshaft acceleration. The first misfire detector detects a misfire in response to the first deviant acceleration and a first predetermined threshold. The second misfire detector responds to occurrence of misfires at a rate of 50% by determining a second deviant acceleration in response to a difference between a raw crankshaft acceleration and a second baseline acceleration. The second baseline acceleration is comprised of a median average of a second predetermined number of samples of the raw crankshaft acceleration. The second misfire detector detects a misfire in response to the second deviant acceleration and a second predetermined threshold, wherein the second predetermined threshold is not equal to the first predetermined threshold.

DETAILED DESCRIPTION OF PREFERRED EMBODIMENTS

Figure 1:
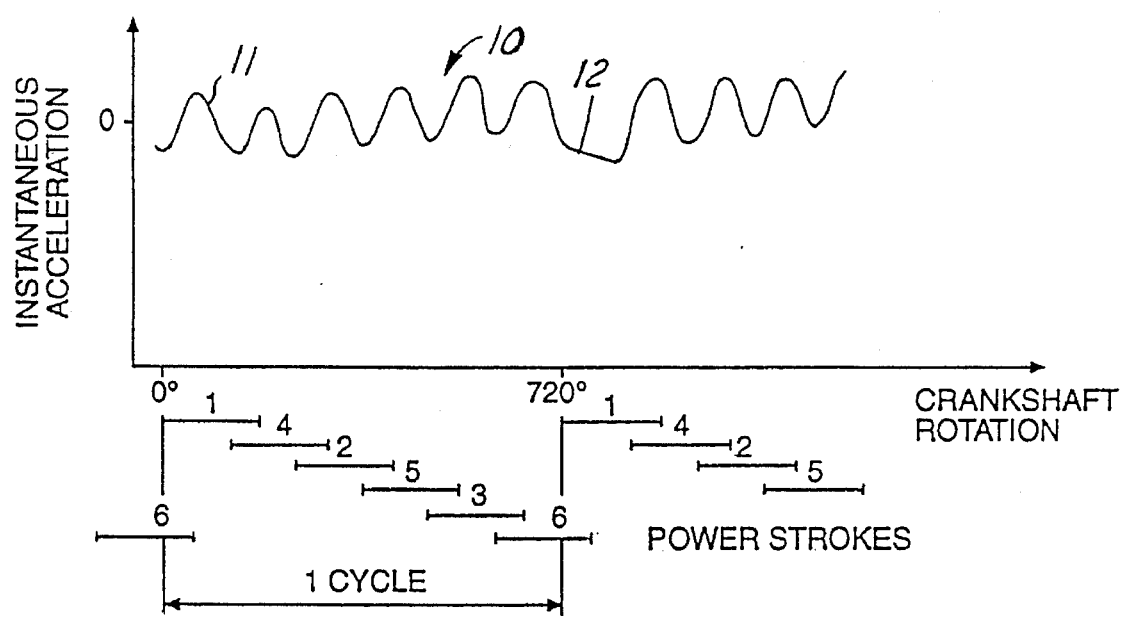
FIG. 1 is a plot showing instantaneous acceleration versus crankshaft rotation for normal and misfiring cylinders.

In the typical four-stroke combustion engine, the four strokes include the intake stroke, the compression stroke, the power stroke, and the exhaust stroke. As shown in FIG. 1, the power strokes of the respective cylinders are arranged in a particular order according to crankshaft position. Furthermore, in any engine having more than four cylinders, the power strokes of different cylinders will overlap. One engine cycle is comprised of 720° of crankshaft rotation during which each cylinder passes through each of its four strokes.

Curve 10 in FIG. 1 shows approximate acceleration fluctuation during engine operation. An acceleration peak 11 occurs during the firing interval of cylinder No. 1 and other maximums in the acceleration curve occur approximately corresponding to each other properly firing cylinder. When a misfire occurs such that no significant power is created by a cylinder during its firing interval, the crankshaft decelerates as indicated at 12.

Figure 2:
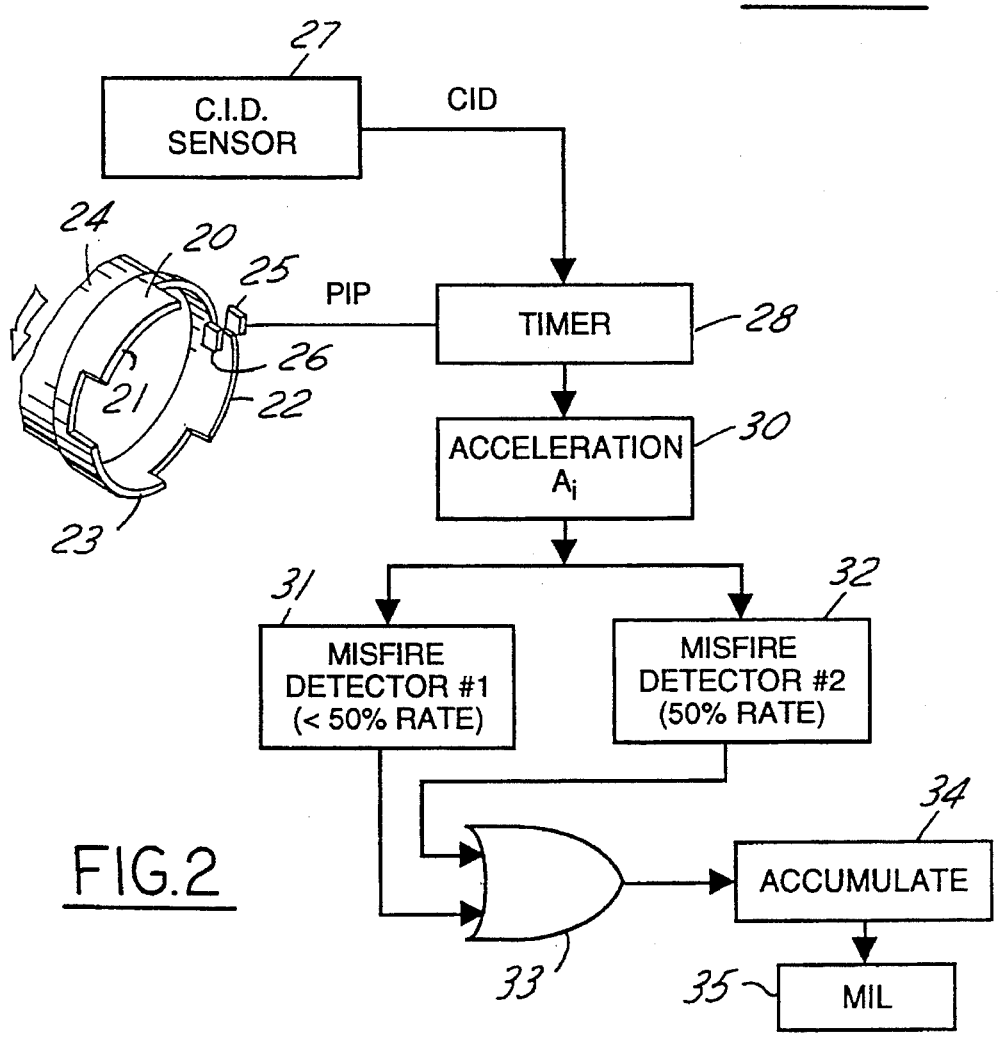
FIG. 2 is a schematic and block diagram showing measuring and calculating apparatus according to the present invention.

FIG. 2 shows one type of apparatus for measuring crankshaft rotation intervals and processing data in order to detect misfires occurring at a rate up to 50%. An engine rotation position sensing system includes a rotor 20 including vanes 21, 22, and 23, which rotate with a crankshaft 24 (a three-vane rotor from a six-cylinder engine is shown in this example while a two-vane rotor may be utilized in a four-cylinder engine). Vanes 21–23 pass between a hall-effect sensor 25 and a permanent magnet 26 to generate a profile ignition pulse (PIP) signal as crankshaft 24 rotates. Vanes 21–23 are arranged to generate a rising edge in the PIP signal at a predetermined position in relation to top dead center of each respective cylinder. The PIP signal actually indicates the approach to top dead center of two engine cylinders, one of which is approaching a power stroke and one of which is approaching an intake stroke since it takes two full crankshaft rotations to complete an engine cycle.

Other types of apparatus, such as the well known variable reluctance sensor and missing tooth wheel, can also be used to derive a PIP signal for sensing crankshaft position.

A cylinder identification (CID) sensor 27 is connected to a camshaft (not shown) for identifying which of the two cylinders is actually on its power stroke. The camshaft rotates once for every two rotations of crankshaft 24. The resulting CID signal includes transitions which identify a cylinder approaching its power stroke. A timer 28 receives the PIP signal and the CID signal and measures a lapsed time between predetermined engine position locations as determined by the PIP and CID signals. The elapsed time for each velocity measuring interval i is output from timer 28 to an acceleration determination block 30. A raw acceleration value A(i) is determined based on the elapsed time interval and the known or assumed rotation interval corresponding to interval I.

Raw acceleration values are input to a first misfire detector 31 and a second misfire detector 32. The detectors operate concurrently such that first misfire detector 31 senses misfires during times that less than 50% misfires are occurring and second misfire detector 32 senses misfires during times that misfires at a rate of 50% are occurring. Detectors 31 and 32 each output a misfire detection signal to a respective input of an OR gate 33 for each cylinder misfire detected. The OR'ed output of OR gate 33 is connected to an accumulate block that stores misfire data and determines the overall rate of misfires. If a misfire condition (e.g., misfires occurring at greater than a predetermined overall rate) is detected then an indication signal is coupled to a misfire indication light (MIL) 35 to signal a driver of the condition.

Figure 3:
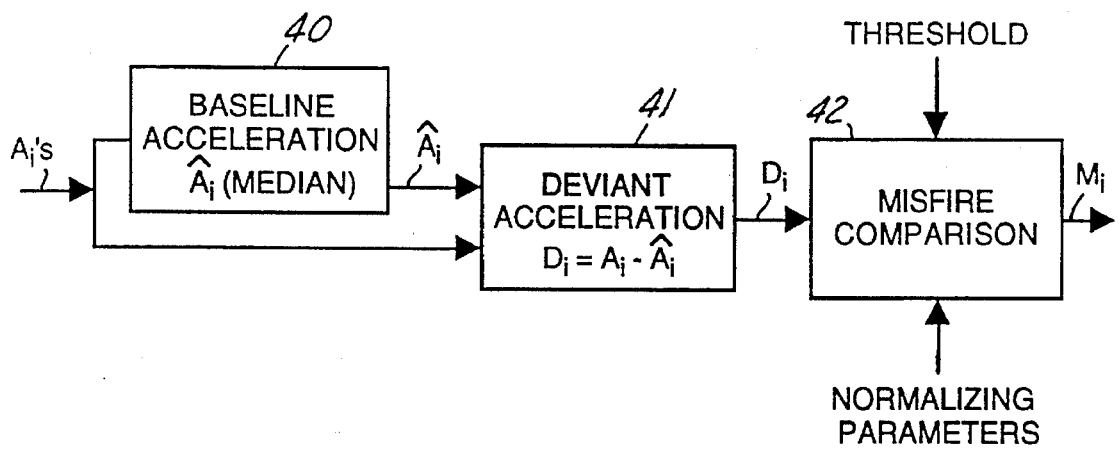
FIG. 3 is a block diagram showing how a misfire determination is made.

The detection of a misfire based on raw crankshaft acceleration values is shown in greater detail in FIG. 3. A baseline acceleration block 40 receives the successive raw acceleration values from block 30 (FIG. 2). The accumulated raw values are passed through an averaging filter o determine the baseline acceleration $\bar{A}_i$. The raw acceleration and the baseline acceleration are input to a deviant acceleration block 41 which forms the difference of these two values. The resulting deviant acceleration $D_i$ is input to a misfire comparison block 42 along with a misfire threshold and normalizing parameters of the engine that permit an estimate of the expected acceleration. For example, the deviant acceleration may be scaled by an expected torque corresponding to the instantaneous engine operating conditions in order to form a power loss value, as described in the previously mentioned patents. Misfire comparison block 42 generates a misfire detection signal $M_i$ that indicates for each cylinder event whether there was detected 1) a proper firing, 2) a misfire, or 3) a condition during which a misfire call cannot be reliably made (i.e., a "no-test" condition). A no-test condition is detected according to the noise present in the acceleration data, for example.

In a preferred embodiment, timer 28, blocks 30–34, and blocks 40–42 are implemented as part of a microcontroller with associated memory and software instructions.

Figure 4:
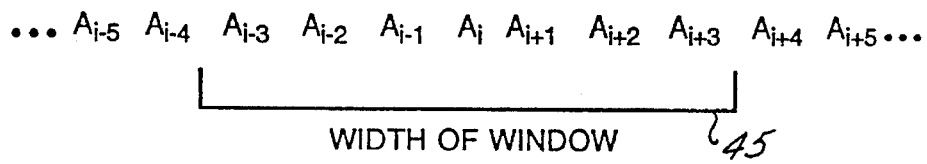
FIG. 4 shows a series of acceleration measurements for consecutive firing intervals of an engine with corresponding notation to denote consecutive cylinder events and showing a sliding window for determining a median average.

FIG. 4 shows a stream of raw acceleration measurements in relation to a specific time interval i. A sliding window 45, preferably centered on raw acceleration measurement $A_i$, provides input values for an averaging filter to derive baseline acceleration. Thus, the series of accelerations for determining the average acceleration value includes an odd number of consecutive acceleration measurements having the respective acceleration value of interest at the center. With N being the number of cylinders in the internal combustion engine, the number of acceleration measurements within a series for computing an average acceleration (i.e., the width of the sliding window) is preferably equal to at least N. For example, in a 4-cylinder engine, a preferred window size equal to 5 acceleration samples has been used. Nevertheless, other window sizes may also be utilized.

According to the prior art, the baseline acceleration value (also known as the gross acceleration value corresponding to the interval of interest) is determined by forming a median average. In other words, the raw acceleration values in the sliding window are arranged in order according to their magnitudes and the value at the center of the ordered series is taken as the average. Thus, the median has the same number of values greater than it than there are lesser than it.

Figure 5:
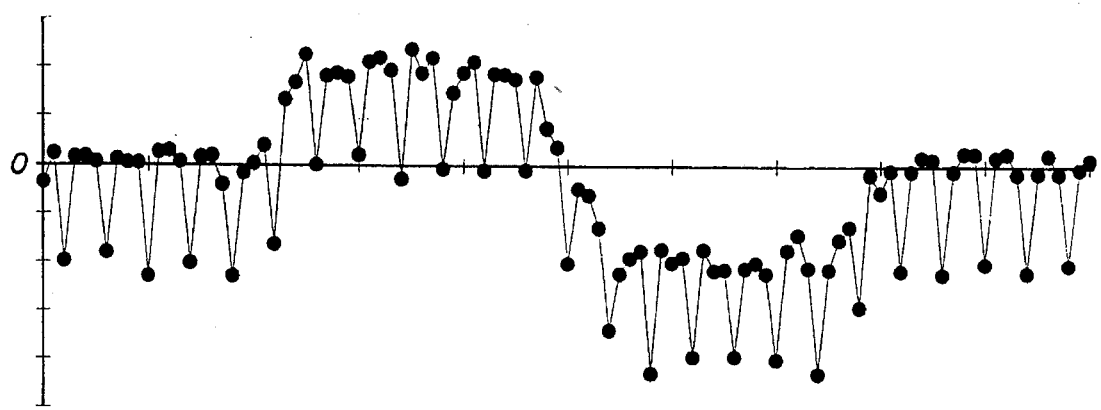
FIG. 5 is a plot of raw acceleration data with an introduced misfire rate of 25% (or 1-in-4 cylinders) and a varying baseline acceleration.
Figure 6:
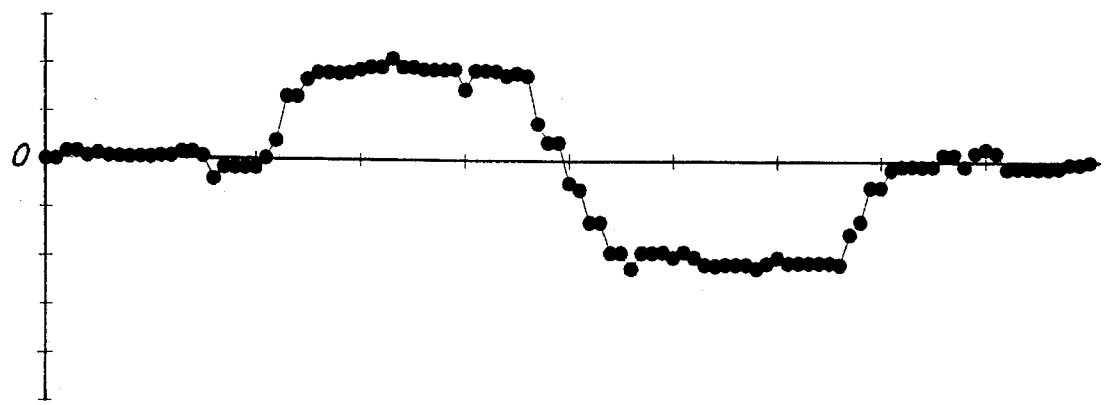
FIG. 6 is a plot of median-filtered acceleration derived from FIG. 4.
Figure 7:
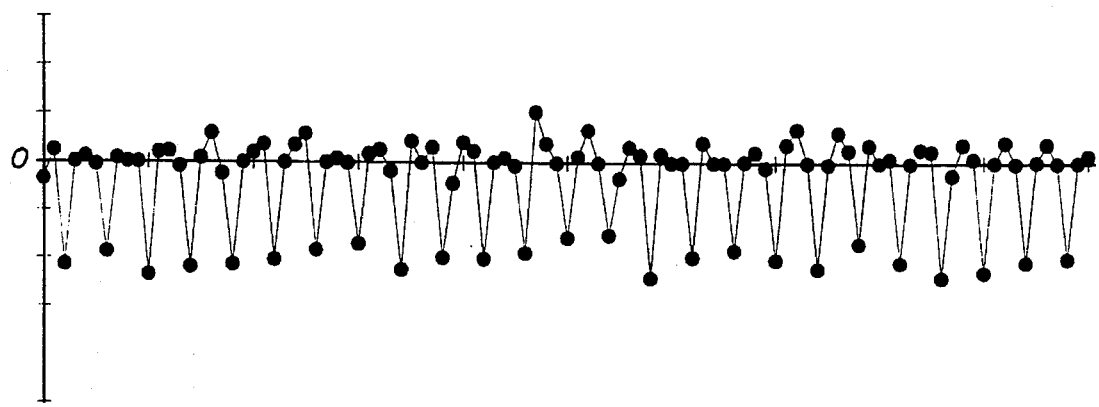
FIG. 7 is a plot of deviant acceleration obtained as the difference between data values from FIGS. 4 and 5.

Performance of a misfire detector using the foregoing median-filter is shown in FIGS. 5–9. FIG. 5 plots raw acceleration values in a 4-cylinder engine with one of the four cylinders repeatedly misfiring. In addition, the engine is operating with a fluctuating baseline acceleration. FIG. 6 shows the results of median averaging of the data shown in FIG. 5 using a sliding window including 5 samples (median width of 5). Thus, FIG. 6 shows a baseline acceleration showing the gross acceleration of the engine with the effects of misfire removed. Forming the difference between the data of FIGS. 5 and 6 produces a deviant acceleration as shown in FIG. 7 which highlights the effect of misfire. With the data from FIG. 7, it becomes possible to identify misfires by comparison with a threshold, especially after further processing such as to form power loss values as described in the previously cited patents.

Figure 8:
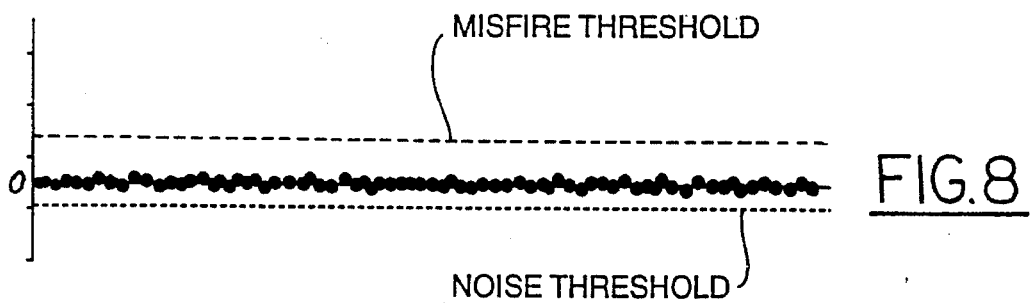
FIG. 8 is a plot of deviant acceleration determined for a 4-cylinder engine with alternating misfires (every other cylinder) and a median width of 5.

FIG. 8 shows deviant acceleration values for a 4-cylinder engine but with a misfire rate of 50% wherein two alternating cylinders of the four cylinder engine are disabled. Five samples are used in the median filter. It is readily apparent from FIG. 8 that the deviant acceleration fails to cross that misfire threshold at all and that the 50% misfires are not detected.

Figure 9:
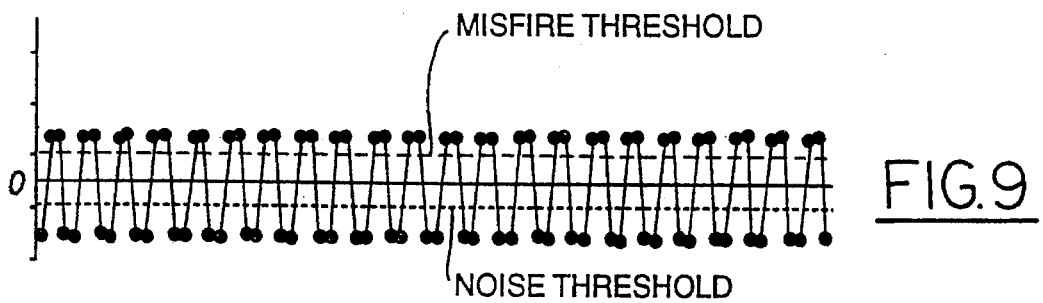
FIG. 9 is a plot of deviant acceleration determined for a 4-cylinder engine with two consecutive cylinders disabled (50% misfire) and a median width of 5.

FIG. 9 shows deviant acceleration values for a 4-cylinder engine but with a misfire rate of 50% wherein two consecutive cylinders of the four cylinder engine are disabled. Again, five samples are used in the median filter. It is readily apparent from FIG. 9 that the deviant acceleration alternately crosses the misfire threshold and the noise threshold, which defeats misfire detection by causing the detector to enter a no-test condition.

According to the present invention, it has been recognized that by applying a correction to a deviant acceleration that alternately crosses the misfire threshold and the noise threshold, a 50% misfire rate can still be reliably detected. What is needed is a deviant acceleration that cyclically alternates under expected conditions of 50% misfire. In a 4-cylinder engine, any likely failure that would cause 50% misfires would appear on either alternating or consecutive cylinders. This invention ensures a cyclical deviant acceleration under these conditions by appropriate selection of the width (i.e., number of samples) of the median. For the 4-cylinder engine example, a median width of 7 (rather than the typical width of 5) provides the desired cyclical deviant acceleration.

Figure 10:
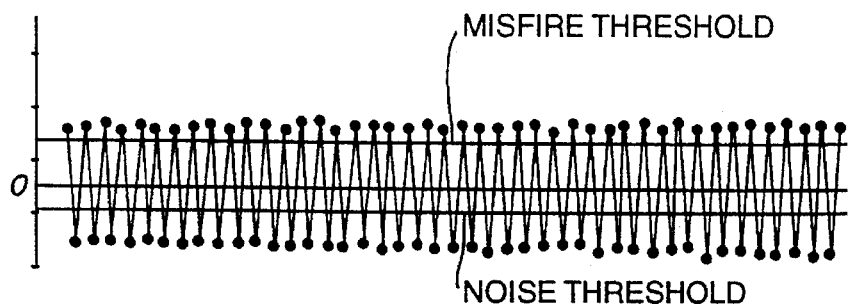
FIG. 10 is a plot corresponding to FIG. 8 but with a median width of 7.

Thus, FIG. 10 shows deviant acceleration values for a 4-cylinder engine with a misfire rate of 50% wherein two alternating cylinders of the four cylinder engine are disabled and with the modification that seven samples are used in the median filter. The desired cyclical waveform of the deviant acceleration is obtained.

Figure 11:
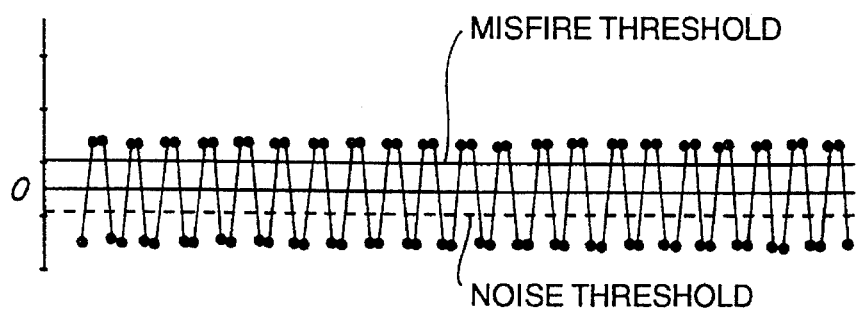
FIG. 11 is a plot corresponding to FIG. 9 but with a median width of 7.

FIG. 11 shows deviant acceleration values for the case wherein two consecutive cylinders of the four cylinder engine are disabled. Seven samples are used in the median filter resulting in the desired cyclical deviant acceleration. In investigating the 4-cylinder engine example, applicants found that of median widths of 3, 5, 7, 9, and 11, only the median width of 7 provides the necessary cyclical waveform for both cases of 50% misfire (i.e., consecutive and alternating cylinders).

In FIGS. 10 and 11, the deviant acceleration crosses both the misfire threshold and the noise threshold used in the normal (<50% misfire) detector. In implementing the 50% misfire detector, this invention determines a corrected deviant acceleration and employs a separate misfire threshold. The correction shifts the deviant acceleration in the positive direction away from the noise threshold by an amount equal to the amplitude of the cyclical waveform. This about doubles the deviant acceleration on misfire and requires a 50% misfire threshold about double the normal threshold.

A specific form of the correction is as follows:

Corrected deviant acceleration = $|D_{i-1}| + D_i$ where $D_i$ is the current value of deviant acceleration and $D_{i-1}$ is the previous value. Using this correction, a doubling of the corrected deviant acceleration occurs only when the uncorrected waveform is symmetrical about a zero deviant acceleration. Therefore, with the misfire threshold being approximately doubled, only the occurrence of 50% misfires will be detected.

Figure 12:
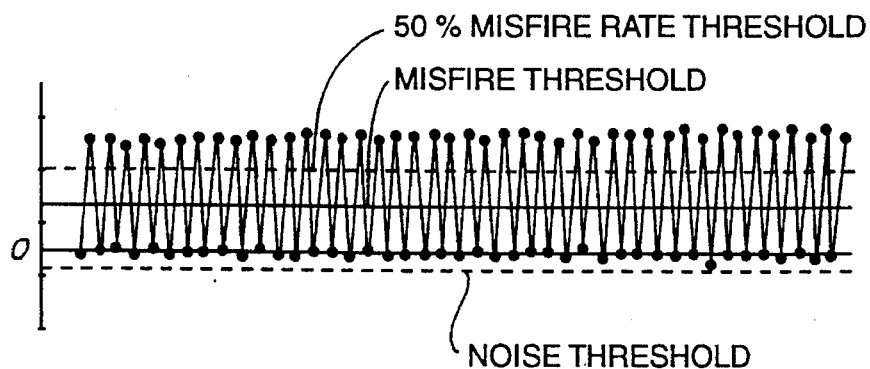
FIG. 12 is a plot of corrected deviant acceleration derived from FIG. 10.
Figure 13:
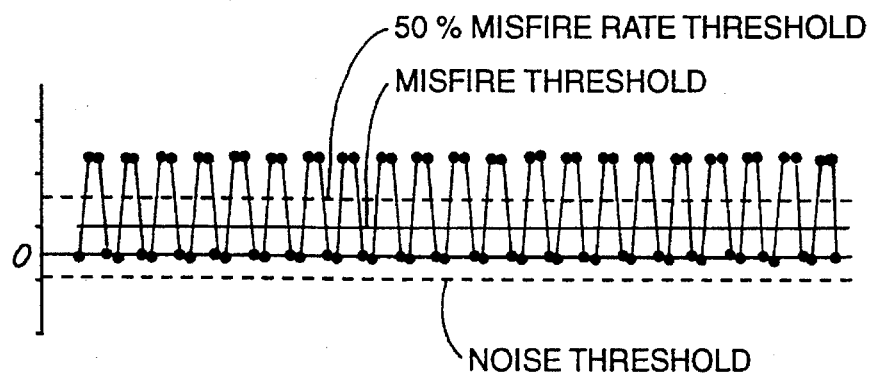
FIG. 13 is a plot of corrected deviant acceleration derived from FIG. 11.

FIG. 12 plots corrected deviant acceleration after applying the correction to the data shown in FIG. 10. The 50% misfire threshold is exceeded for the alternating cylinders that were disabled. Likewise, FIG. 13 plots corrected deviant acceleration after applying the correction to the data shown in FIG. 11. The 50% misfire threshold is exceeded for the consecutive cylinders that were disabled.

What is claimed is:

1. A misfire detection system for a multicylinder internal combustion engine having a crankshaft, comprising:

a first misfire detector responsive to occurrence of misfires at rates less than 50%, said first misfire detector determining a first deviant acceleration in response to a difference between a raw crankshaft acceleration and a first baseline acceleration, said first baseline acceleration being comprised of a median average of a first predetermined number of samples of said raw crankshaft acceleration, and said first misfire detector detecting a misfire in response to said first deviant acceleration and a first predetermined threshold; and a second misfire detector responsive to occurrence of misfires at a rate of 50%, said second misfire detector determining a second deviant acceleration in response to a difference between a raw crankshaft acceleration and a second baseline acceleration, said second baseline acceleration being comprised of a median average of a second predetermined number of samples of said raw crankshaft acceleration, and said second misfire detector detecting a misfire in response to said second deviant acceleration and a second predetermined threshold, wherein said second predetermined threshold is not equal to said first predetermined threshold.

2. The system of claim 1 wherein said second predetermined number of samples is selected to provide said second deviant acceleration with a cyclical waveform during conditions of 50% misfire, said cyclical waveform oscillating periodically about a zero deviant acceleration.

3. The system of claim 2 wherein said second misfire detector generates a corrected deviant acceleration by summing a current value of said second deviant acceleration with an absolute value of another value of said second deviant acceleration, wherein said second predetermined threshold is about twice said first predetermined threshold, and wherein said second misfire detector detects misfire in response to a comparison of said corrected deviant acceleration and said second predetermined threshold.

4. The system of claim 2 wherein said internal combustion engine is a 4-cylinder engine and wherein said second predetermined number of samples is equal to 7.

5. A method of detecting a 50% misfire rate in a multicylinder internal combustion engine having a crankshaft, said method comprising the steps of:

measuring crankshaft acceleration corresponding to each of a plurality of cylinder events during operation of said engine;

selecting one of said cylinder events for misfire detection;

determining a baseline acceleration over a series of said cylinder events including said selected cylinder event, said baseline acceleration being determined in response to a median average of said measured crankshaft acceleration over said series;

determining a deviant acceleration of said selected cylinder event from said baseline acceleration, wherein said series of said cylinder events includes a predetermined number of cylinder events that is selected to provide a deviant acceleration with a cyclical waveform during conditions of 50% misfire;

determining a corrected deviant acceleration in response to a current value of said deviant acceleration and another value of said deviant acceleration; and detecting a misfire of said selected cylinder event in response to a comparison of said corrected deviant acceleration and a predetermined threshold.

6. The method of claim 5 wherein said corrected deviant acceleration is obtained from the sum of said current value and the absolute value of said another value of said deviant acceleration.

7. The method of claim 5 wherein said another value is adjacent to said current value.

* * * * *